(12) United States Patent
Hu et al.

(10) Patent No.: US 7,698,003 B2
(45) Date of Patent: Apr. 13, 2010

(54) SYSTEM FOR GENERATING STANDARD OPERATING PROCEDURE(SOP) FILES

(75) Inventors: Yang Hu, Shenzhen (CN); Fu-Shun Huang, Taipei Hsien (TW); Yun-Feng Zhang, Shenzhen (CN); Chun-Lin Zhou, Shenzhen (CN); Hua Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 259 days.

(21) Appl. No.: 11/560,857

(22) Filed: Nov. 17, 2006

(65) Prior Publication Data

US 2007/0142958 A1 Jun. 21, 2007

(30) Foreign Application Priority Data

Dec. 16, 2005 (TW) .............................. 94144784 A

(51) Int. Cl.
*G05B 11/01* (2006.01)
*G05B 15/00* (2006.01)
*G06F 17/50* (2006.01)

(52) U.S. Cl. ................................ 700/17; 700/83; 703/1
(58) Field of Classification Search .................. 700/17, 700/83; 703/1

See application file for complete search history.

(56) References Cited

U.S. PATENT DOCUMENTS

| 5,822,207 | A | * | 10/1998 | Hazama et al. | ................ 700/97 |
| 5,991,528 | A | * | 11/1999 | Taylor et al. | .................... 703/6 |
| 6,243,611 | B1 | * | 6/2001 | Hazama et al. | ................ 700/97 |
| 6,539,399 | B1 | * | 3/2003 | Hazama et al. | .......... 707/104.1 |
| 6,999,897 | B2 | | 2/2006 | Tai et al. | |
| 2001/0004840 | A1 | * | 6/2001 | Nagasawa | .................... 72/14.8 |
| 2001/0012021 | A1 | * | 8/2001 | Nishiyama et al. | .......... 345/763 |
| 2001/0034562 | A1 | * | 10/2001 | Aumer et al. | ................. 700/97 |
| 2001/0049953 | A1 | * | 12/2001 | Nagasawa | .................... 72/14.8 |
| 2005/0096768 | A1 | * | 5/2005 | Huang et al. | .................. 700/97 |

FOREIGN PATENT DOCUMENTS

TW I238087 8/2005

* cited by examiner

*Primary Examiner*—Ronald D Hartman, Jr
(74) *Attorney, Agent, or Firm*—Wei Te Chung

(57) ABSTRACT

A standard operating procedure (SOP) file generating system (12) includes a drawing selection module (120), an information reading module (121), a data determining module (122), a machining type determining data module (124), and a file generating module (127). The drawing selection module selects an engineering drawing. The information reading module reads product information and machining data of the engineering drawing. The data determining module determines whether the machining data accords with machining requirement. The machining type determining module determines a machining type. The file generating module generates an SOP file.

16 Claims, 4 Drawing Sheets

SYSTEM FOR GENERATING STANDARD OPERATING PROCEDURE(SOP) FILES

BACKGROUND OF THE INVENTION

1. Field of the Invention

The present invention pertains to procedure file generating systems, and particularly to a system for generating standard operating procedure (SOP) files.

2. Description of Related Art

With rapid development of industries, an industry product comprises more and more workpieces that are manufactured in relatively complicated machining procedures with various machining equipment. For the purpose of simplifying the machining procedures, a standard operating procedure (SOP) file is applied to control the manufacturing of the product. Typically, an SOP file is compiled according to the experience of operators. However, when complex products with various workpieces are manufactured, generating an SOP file depending on the experience of operators costs too much time.

Therefore, a heretofore unaddressed need exists in the industry to overcome the aforementioned deficiencies and inadequacies.

SUMMARY OF THE INVENTION

In one aspect of the present invention, a system for generating a standard operating procedure (SOP) file includes a drawing selection module, an information reading module, a data determining module, a machining type determining data module, and an SOP file generating module. The drawing selection module selects an engineering drawing. The information reading module reads product information and machining data of the engineering drawing. The data determining module determines whether the machining data accords with predetermined machining requirements. The machining type determining module determines a machining type. The file generating module generates an SOP file.

Another aspect of the present invention provides a method for generating the SOP file. The method includes the following steps: selecting an engineering drawing; reading product information and machining data; determining whether the machining data accords with machining requirements; determining a machining type if the machining data does accord with the machining requirements; and generating an SOP file according to the product information, machining data, and machining type.

Other advantages and novel features will become more apparent from the following detailed description when taken in conjunction with the accompanying drawings, in which:

DETAILED DESCRIPTION OF THE INVENTION

Figure 1:
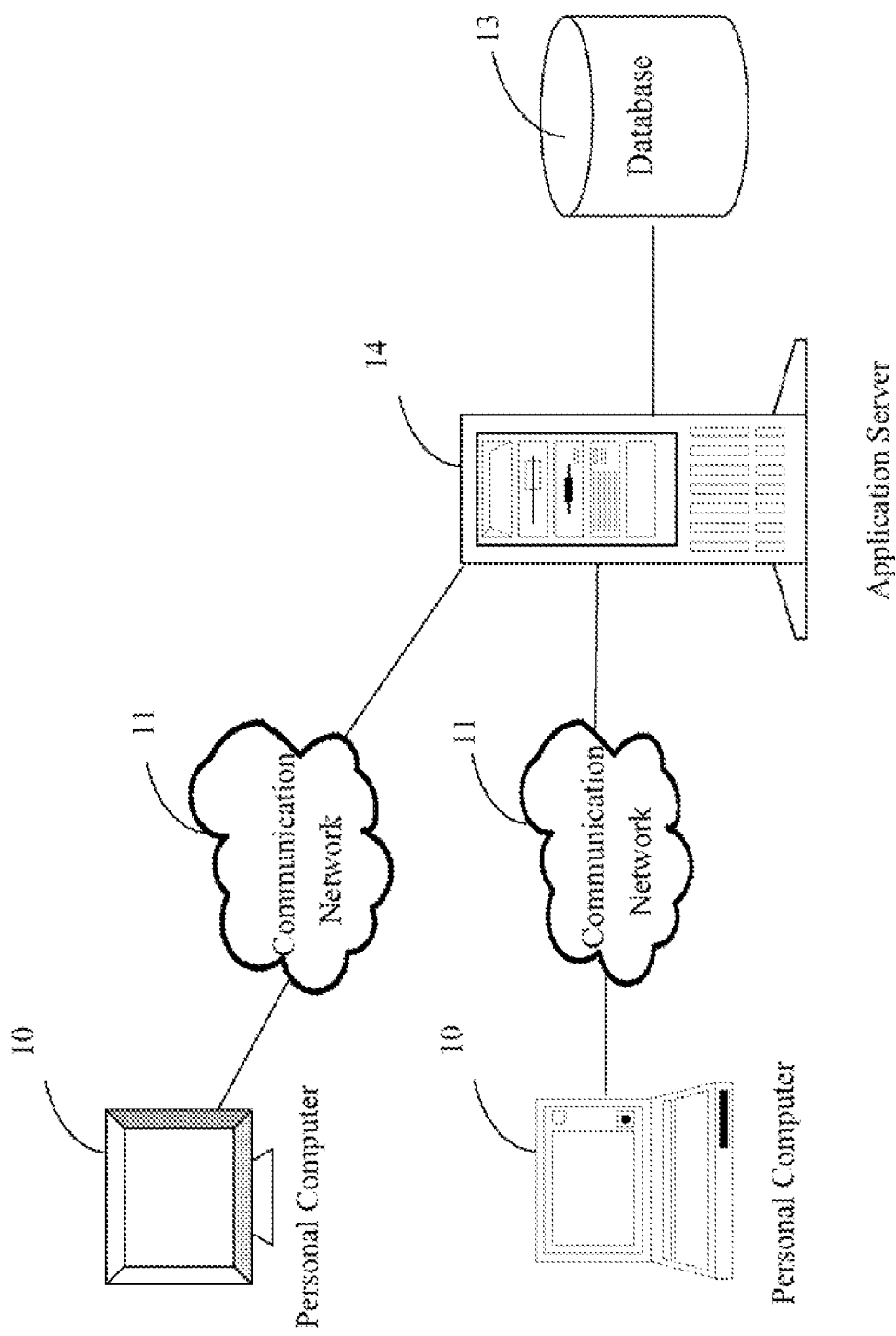
FIG. 1 is a schematic diagram of an application environment of a system for generating standard operating procedure (SOP) files in accordance with an exemplary embodiment of the present invention.

Referring to FIG. 1, a schematic diagram of application environment of a system for generating standard operating procedure (SOP) files in accordance with an exemplary embodiment of the present invention is shown. A plurality of personal computers 10 communicates with an application server 14 via a communication network 11, and a database 13 communicates with the application server 14. In the exemplary embodiment, the personal computers 10 can be desktop computers, laptop computers, notebook computers, and so on. The communication network 11 can be an intranet, the Internet, and other networks known in the art. The database 13 is used for storing information generated during a process of generating SOP files. The information comprises machining types, product names, product parts numbers, mold codes, and version numbers of the generated SOP files. And the personal computers 10 are used for transferring engineering drawing to the application server 14, or request the application server 14 for transferring the information stored in the database and listing the information in a SOP file in a predetermined format.

Figure 2:
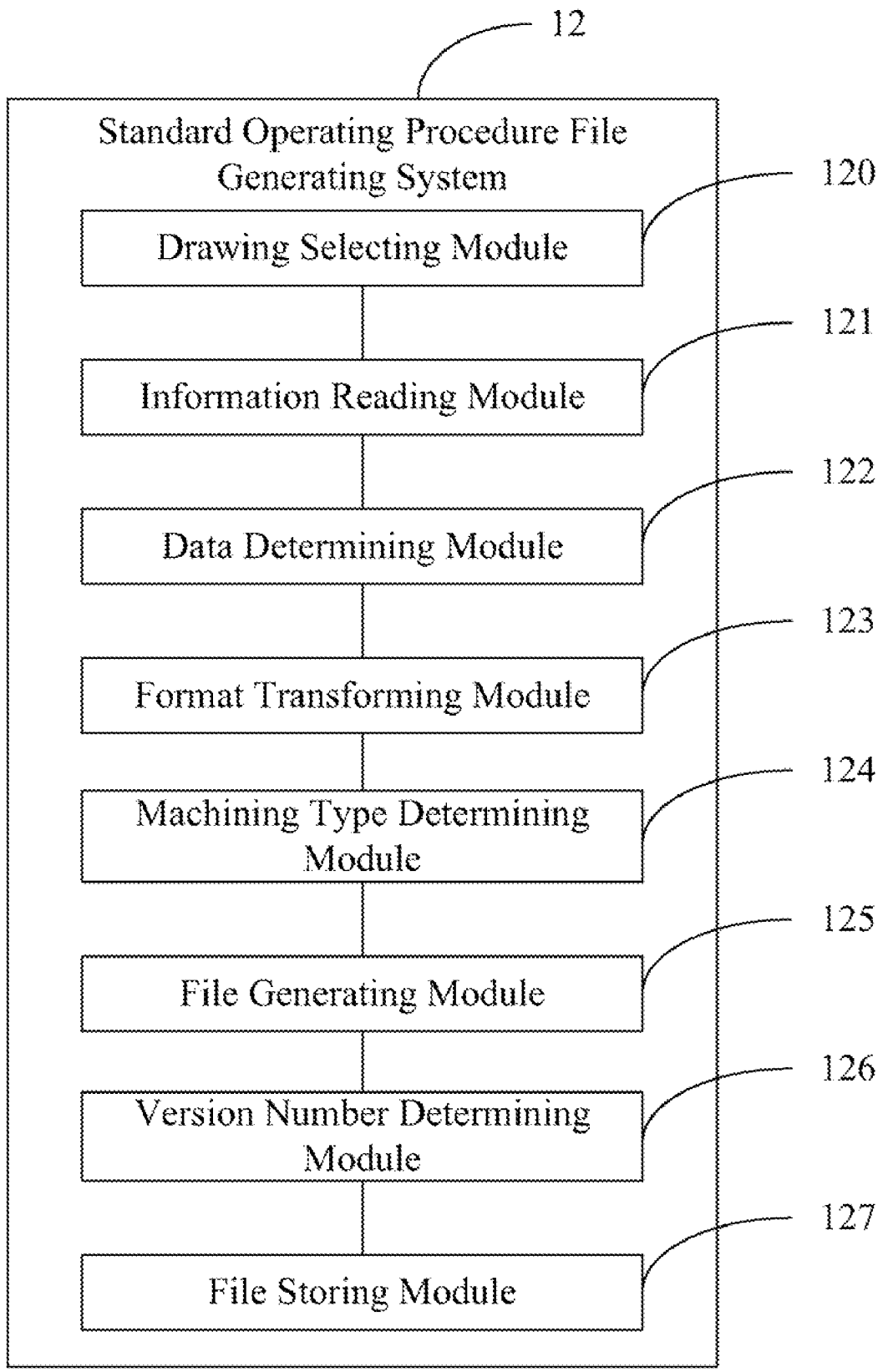
FIG. 2 is a block diagram of the system for generating SOP files of the present invention.

FIG. 2 is a block diagram of a SOP generating system 12 installed in the application server 14. The SOP generating system 12 comprises a drawing selection module 120, an information reading module 121, a data determining module 122, a format transforming module 123, a machining type determining module 124, a file generating module 125, a version number determining module 126, and a file storing module 127.

The drawing selection module 120 is used for selecting an engineering drawing showing workpieces that are to be manufactured. The information reading module 121 is used for reading the product information and the machining data indicated by the engineering drawing or inputted by operators. In the exemplary embodiment, the product information comprises product parts numbers, working procedure code names, machining standards indicated by the engineering drawing, and product pictures inputted by the operators. The machining data comprise machining quantity, mold codes, equipment models, machining parameters. The product information and the machining data are stored in the database 13.

The data determining module 122 is used for determining whether the machining data received accord with predetermined machining requirements. In detail, the data determining module 122 determines whether the machining data comprise all indispensable data, and whether the machining data is in a normative format that the system can read.

The format transforming module 123 is used for transforming non-normative format machining data to a normative format that the system can read. The machining type determining module 124, according to the machining data, determines a machining type, such as drilling. The file generating module 125 is used for generating an SOP file according to the product information, machining data and machining type. The SOP files indicates operation guidance, attention proceeding, product code names, mold codes and the product information received from the engineering drawing or inputted by the operators.

The version number determining module 126 is used for generating a version number for the generated SOP file according to the version numbers of old SOP files stored in the database 13. In this embodiment, if there is a previous version number of an SOP file on a similar product in the database 13, the version number determining module 126 generates an updated SOP file version number based on the previous version number for the product; if there is not a previous version number of the SOP file in the database 13, the version number determining module 126 generates a new SOP file version number for the product. For example, if the SOP file on a similar product has a previous version number, a11, the SOP file version number generated by the version number determining module 126 can be a12. On the other hand, if there is not an SOP file version number in the database 13, the version number determining module 126 generates a new version number, such as a11. The file storing module 127 is used for storing the generated SOP files according to the version number.

Figure 3:
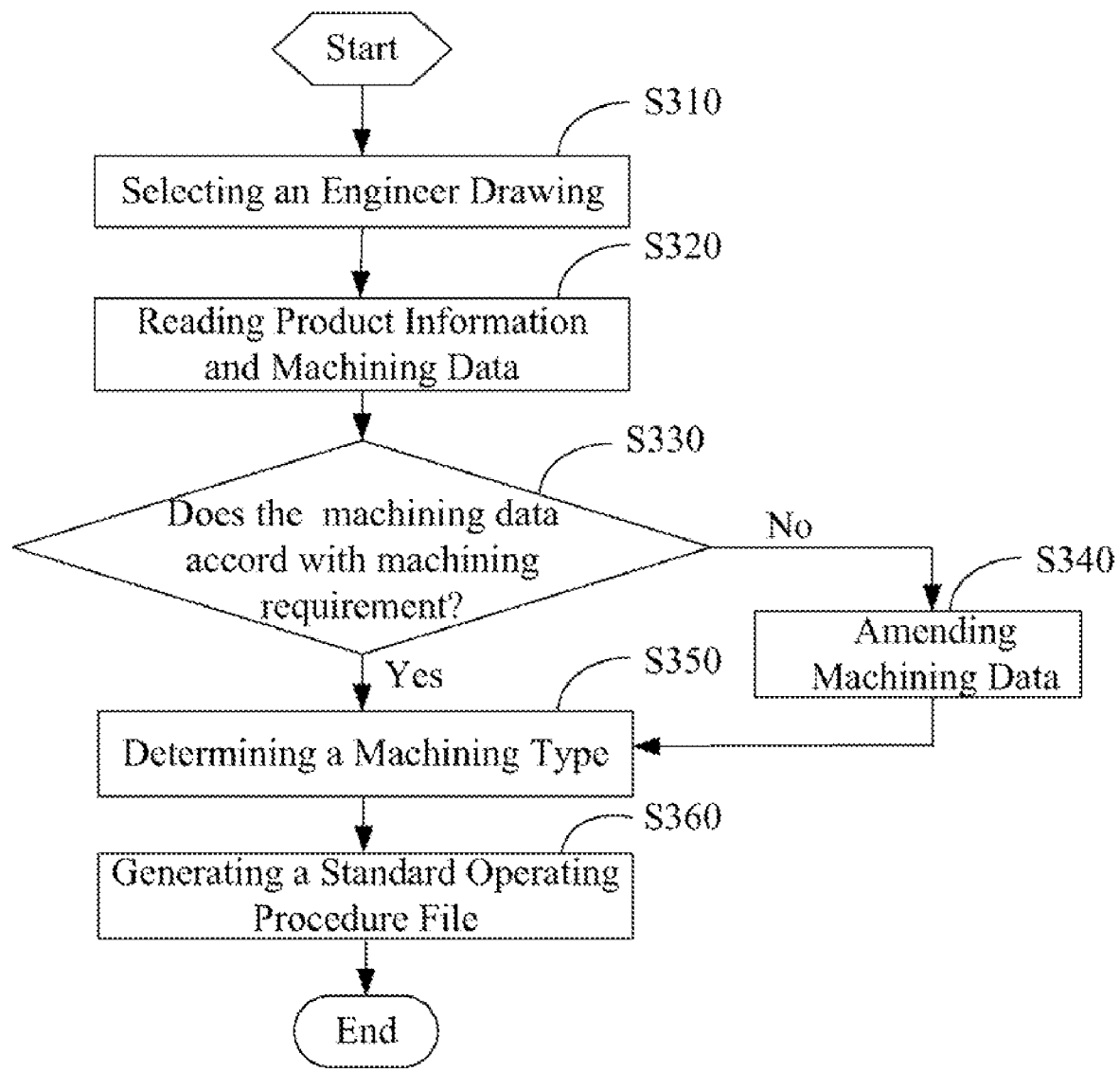
FIG. 3 is a flowchart of a method for generating SOP files in accordance with another exemplary embodiment of the present invention.

FIG. 3 shows a flowchart of a method for generating an SOP file in accordance with another exemplary embodiment of the present invention. In Step S310, the drawing selection module 120 selects an engineering drawing. In Step S320, the information reading module 121 reads product information and machining data indicated in the engineering drawing. In the exemplary embodiment, the product information comprises parts numbers, working procedure code names, machining standards and so on. The machining data comprise machining quantity, mold codes, equipment models, machining parameters and so on. In Step S330, the data determining module 122 determines whether the machining data received by the system accord with the machining requirements, in detail, whether the machining data comprise all indispensable data, and whether a format of the machining data is a normative format that the system can read. If the machining data received are not complete and properly formatted, Step S340 is carried out, and the machining data are amended. If the machining data received are complete and properly formatted, Step S350 is carried out, and the machining type determining module 123 determines the machining type according to the product information and the machining data. In Step S360, the file generating module 124 generates an SOP file according to the product information, machining data and machining type.

Figure 4:
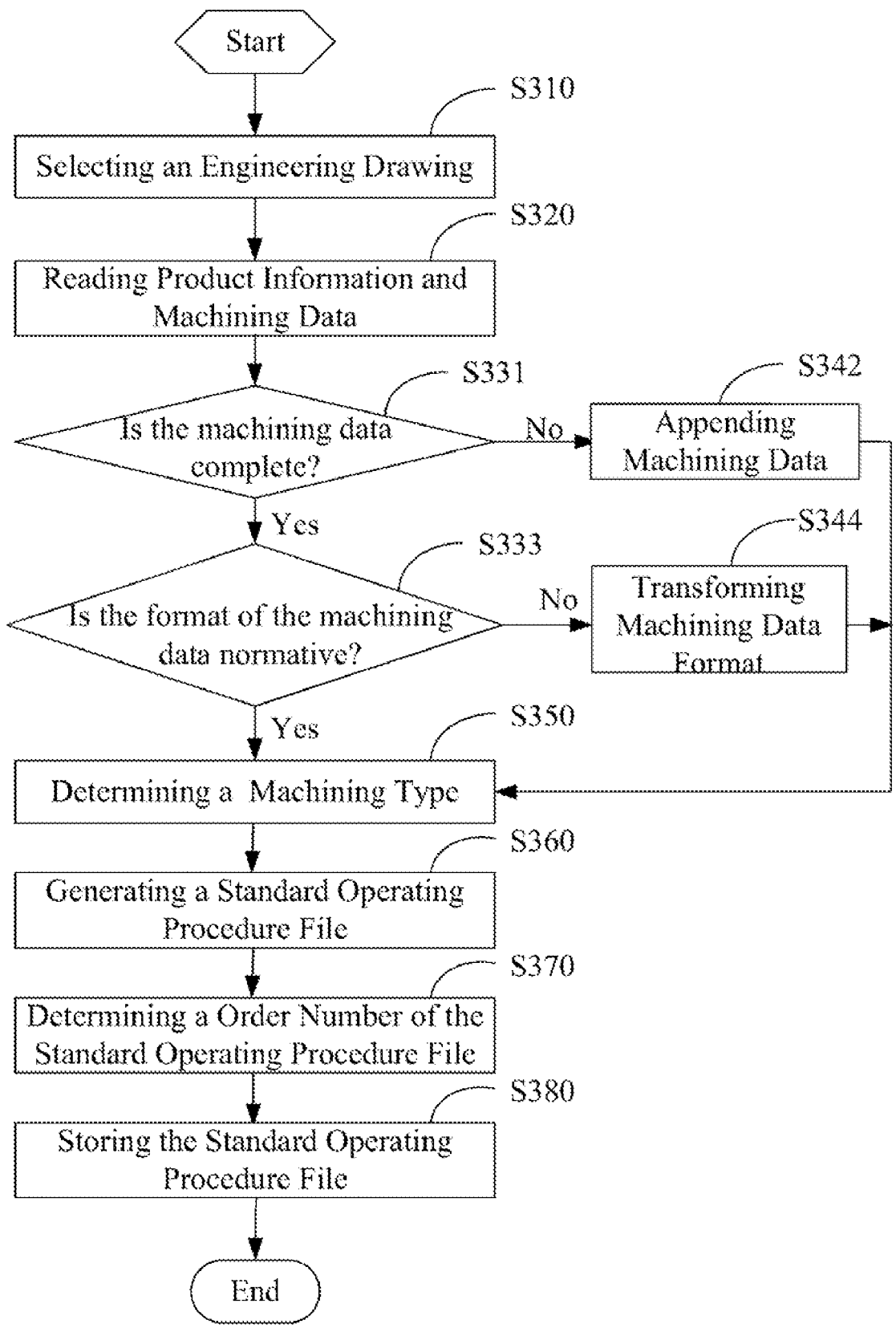
FIG. 4 is a flowchart of a method for generating SOP files in accordance with still another exemplary embodiment of the present invention.

FIG. 4 shows a flowchart of a method for generating an SOP file in accordance with still another exemplary embodiment of the present invention. In FIG. 4, Step S331 and Step S333 are detailed steps of Step S330 in FIG. 3, Step S342 and Step S344 are detailed steps of Step S340 in FIG. 3, Step S370 and Step S380 are additional steps, and other steps of the present exemplary embodiment are the same as those in FIG. 3. Wherein, in Step S331, the data determining module 122 determines whether the machining data comprise all predetermined necessary data. If the machining data do not comprise all the necessary data, Step S342 is carried out, and an operator appends missing machining data. If the machining data comprise all the necessary data, Step S333 is carried out, and the data determining module 122 determines whether the format of the machining data is normative. If the received machining data format is non-normative, Step S344 is carried out, and the format transforming module 123 transforms the non-normative format of the machining data to a normative format that the system can read. In Step S370, the version number determining module 126, according to version number of similar SOP files stored in the database 13, generates an updated version number of the generated SOP file. In Step S380, the file storing module 127 stores the generated SOP file according to the generated version number.

The system of the present invention can generate SOP files according to engineering drawing and need of operators, which helps achieve standardization of product manufacture. And the mold codes indicated by the generated SOP files can help operators select and change molds with a code scanner.

While an exemplary embodiment has been described above, it should be understood that it has been presented by way of example only and not by way of limitation. Thus the breadth and scope of the present invention should not be limited by the above-described exemplary embodiment, but should be defined only in accordance with the following claims and their equivalents.

What is claimed is:

1. An application sewer system configured to generate standard operating procedure (SOP) files, the system comprising:
   a drawing selection module configured to select an engineering drawing from a database;
   an information reading module configured to read product information and machining data of the engineering drawing from the database;
   a data determining module configured to determine whether the machining data accord with predetermined machining requirements and determine whether a format of the machining data is in a normative format that the system can read;
   a machining type determining module configured to determine a machining type according to the product information and machining data; and
   a file generating module configured to generate an SOP file according to the product information, machining data and machining type.

2. The system as claimed in claim 1, wherein the SOP file generating system further comprises a version number determining module configured to determine version numbers for the generated SOP files.

3. The system as claimed in claim 2, wherein the SOP file generating system further comprises a file storing module used configured to store the generated SOP files according to the version numbers of the SOP files.

4. The system as claimed in claim 1, wherein the SOP file generating system further comprises a format transforming module, for transforming the format of the machining data to a normative format.

5. The system as claimed in claim 1, wherein the product information comprises parts numbers, working procedure code names and machining standards.

6. The system as claimed in claim 1, wherein the machining data comprise machining quantity, mold codes, equipment models and machining parameters.

7. A method configured to generate standard operating procedure (SOP) files, the method executed by an application server comprising the following steps:
   selecting an engineering drawing that includes product information and machining data from a database communicating with the application sewer;
   reading the product information and the machining data from the database;
   determining whether the machining data accord with predetermined machining requirements;
   determining whether the format of the machining data is in a normative format that the system can read;
   determining a machining type according to the product information and the machining data if the machining data accord with the predetermined machining requirements; and
   generating an SOP file according to the product information, machining data and machining type.

8. The method as claimed in claim 7, further comprising the step of determining a version number of the SOP file.

9. The method as claimed in claim 8, further comprising the step of storing the SOP file based on the version number thereof.

10. The method as claimed in claim 7, wherein the step of determining whether the machining data accords with the machining requirements further comprises amending the machining data when the machining data do not accord with the machining requirements.

11. The method as claimed in claim 7, wherein the step of determining whether the machining data is complete further comprises appending machining data when the machining data is not complete.

12. The method as claimed in claim 7, wherein the step of determining whether the format of the machining data is a normative format that the system can read further comprises:
transforming the non-normative format of the machining data to a normative format that the system can read.

13. The method as claimed in claim 7, wherein the step of determining whether the format of the machining data is a normative format comprises:
determining the machining type when the format of the machining data is normative.

14. The method as claimed in claim 7, wherein the product information comprises product parts numbers, working procedure code names, and machining standards.

15. The method as claimed in claim 7, wherein the machining data comprise machining quantity, mold codes, equipment models, and machining parameters.

16. A method configured to generate standard operating procedure (SOP) files, the method executed by an application server comprising:
selecting an engineering drawing including product information and machining data therein from a database communicating with said application server;
retrieving said product information and said machining data out of said engineering drawing from said database;
verifying said retrieved machining data according to predetermined machining requirements;
modifying said verified machining data when said machining data is not verified to accord with said predetermined machining requirements;
determining a machining type according to said retrieved product information and said machining data when said machining data is verified to accord with said predetermined machining requirements; and
generating an SOP file according to said retrieved product information, machining data and machining type;
wherein the step of modifying said verified machining data includes a selected one of a step of appending missing data to said machining data when machining data is not verified to comprise all necessary data, and a step of transforming a format of said machining data when said format of said machining data is not normative.

* * * * *